United States Patent Office 3,154,518
Patented Oct. 27, 1964

3,154,518
POLYVINYL HALIDE COMPOSITIONS MADE FUNGUS RESISTANT WITH CHLORINATED BENZYL THIOCYANATES
Marcel A. Gradsten, Demarest, and Theodore A. Girard, Wayne, N.J., assignors, by mesne assignments, to Heyden Newport Chemical Corporation, a corporation of Delaware
No Drawing. Filed Sept. 9, 1960, Ser. No. 54,847
12 Claims. (Cl. 260—45.9)

This invention relates to novel polyvinyl halide compositions. More particularly it relates to polyvinyl halide compositions having improved resistance to deterioration due to attack by fungi and other microorganisms. The invention also relates to novel procedures for the preparation of these compositions. It further relates to novel fungicidal compositions suitable for use in polyvinyl halide compositions.

Polyvinyl halide compositions have found many useful applications because of their wide range of elastomeric and mechanical properties coupled with their extreme resistance to oxidation, to organic solvents, and to alkalies. These compositions have been used as free or unsupported films and sheeting, as extruded and molded products, as coatings for various textiles, and in other forms.

These polyvinyl halide compositions frequently contain as plasticizers or stabilizers materials that have their origin in animal or vegetable sources and which render the compositions susceptible to deteriorating attacks by fungi and other microorganisms. Such deterioration of the compositions seriously hinders their full scale utilization, particularly in those areas and in those applications that are conducive to such an attack. Various fungicidal compounds have been added to polyvinyl halide compositions to protect them from fungal attack, but none of these has heretofore proven satisfactory. Certain of the fungicides, for example, copper 8-quinolinolate, are exceedingly incompatible with polyvinyl halide compositions, and when present even in very small amounts they crystallize or bloom on the surface of the composition thereby rendering it unfit for use. Other fungicides, such as quaternary ammonium naphthenates, are compatible with the resin and provide adequate protection against fungal attack, but they cannot withstand without darkening or otherwise deteriorating the heating to which they may be subjected during processing as well as subsequent heating of the finished product. While the deterioration that occurs during heating may not detract to any appreciable extent from the physical properties of the resins, the discoloration may seriously restrict their use in many applications.

The present invention relates to a novel group of fungicidal compounds and to their use in polyvinyl halide compositions. These compounds, which provide excellent resistance to deterioration resulting from attack by fungi and other microorganisms, are compatible with polyvinyl halide compositions, do not impart color to the compositions, and have excellent heat stability. The novel fungicides of the present invention are halogenated benzyl thiocyanates which have the structural formula

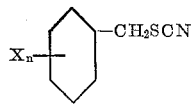

wherein X represents a chlorine, bromine, or iodine atom and $n$ represents a number in the range of 1 to 3, inclusive. Illustrative of these compounds are o-chlorobenzyl thiocyanate, o-bromobenzyl thiocyanate, p-chlorobenzyl thiocyanate, 2,4-dichlorobenzyl thiocyanate, 2,4-diiodobenzyl thiocyanate, 2,4-dibromobenzyl thiocyanate, 3,4-dichlorobenzyl thiocyanate, 3,4-dibromobenzyl thiocyanate, 3,4-diiodobenzyl thiocyanate, 3-chloro-4-bromobenzyl, thiocyanate, 2,4,5-trichlorobenzyl thiocyanate, 2,3,4-trichlorobenzyl thiocyanate, 2,3,6-trichlorobenzyl thiocyanate, 2,4,6-trichlorobenzyl thiocyanate, 2,4,5-tribromobenzyl thiocyanate, and 3-bromo-2,6-dichlorobenzyl thiocyanate. For most applications the preferred fungicides are the dichlorobenzyl thiocyanates and the trichlorobenzyl thiocyanates. A single halogenated benzyl thiocyanate or a mixture of two or more of these compounds may be used in a polyvinyl halide composition.

The halogenated benzyl thiocyanates may be prepared by any convenient procedure. For example, they may be prepared by reacting the appropriate halogenated benzyl halide in the presence or in the absence of a solvent with an alkali metal thiocyanate, such as sodium or potassium thiocyanate. The reaction is preferably carried out by heating the reactants at a temperature between about 65° C. and 120° C. in a solvent, such as a lower aliphatic alcohol, ether, or acetone. The product obtained may be used as such, or it may be purified by washing with hot water and/or recrystallization from a suitable solvent.

The fungicidal compounds of the present invention may be added to the polyvinyl halide resin composition in any convenient way. For example, the halogenated benzyl thiocyanate may be added as such to the resin, or a solution of the thiocyanate in a suitable solvent, such as ethanol, butanol, diethyl ether, or acetone may be added to it. Alternatively, instead of being incorporated into the polyvinyl halide resin, the halogenated benzyl thiocyanate in combination with a suitable solvent or carrier may be applied to the surface of the resin.

The novel polyvinyl halide compositions may be prepared by procedures that are obvious to those skilled in the art. For example, when the product is desired in film or sheet form, the polyvinyl halide resin, plasticizer, fungicide, and other ingredients if any may be mixed with or without the aid of a volatile solvent and milled at an elevated temperature until the composition is completely homogeneous. It may then be removed from the mill in the form of sheets or film of the desired thickness. When the polyvinyl halide composition is to be used as a plastisol, the ingredients may merely be mixed at approximately room temperature until a homogeneous composition is obtained which may then be formed or applied to a surface by such methods as knife-spreading, brushing, roller coating, dipping, molding, and the like.

To attain the desired degree of resistance to attack by fungi, the polyvinyl halide composition should contain at least 0.05% and preferably 0.25% to 2% of the halogenated benzyl thiocyanate based on the weight of the composition. Amounts of the fungicides larger than 2% may be used, but these larger amounts generally do not provide further improvement in the properties of the resinous compositions and for this reason are not ordinarily employed. The amount of fungicide that will provide optimum protection for the resin depends upon such factors as the choice of halogenated benzyl thiocyanate, the choice of plasticizers and stabilizers and the amounts employed, and the application for which the composition is intended.

The vinyl halide polymers which may be employed in the composition of this invention are the resinous products obtained by the polymerization of a vinyl halide in the presence or absence of another polymerizable compound. The term "vinyl halide resin" includes vinyl halide homopolymers, such as polyvinyl chloride and polyvinyl bromide, as well as copolymers, such as those formed between a vinyl halide and at least one other polymerizable monoolefin, such as vinyl acetate, vinyl propionate, vinyl butyrate, vinylidene chloride, styrene, methyl methacrylate, dialkyl fumarate or maleate and the like. The vinyl halide used is ordinarily and preferably the chloride, although the bromide and fluoride may also be used. The copolymers useful in the practice of this invention are those prepared from at least 70% of vinyl halide and up to 30% of the other polymerizable mono-olefinic compound.

Any of the usual plasticizers for vinyl resins may be used in the compositions of the present invention. These include, for example, dioctyl phthalate, dibutyl sebacate, methyl acetyl ricinoleate, and the like. The plasticizer is generally present in the amount of about 5 to 100 parts per 100 parts of the resin. In addition other resin additives, such as heat and light stabilizers, pigments, fillers, extenders, solvents, and the like, may be present in the amounts ordinarily employed for the purposes indicated.

The invention is illustrated by the examples that follow. It is to be understood that the invention is not limited to the particular conditions or reactants except as set forth in the accompanying claims.

EXAMPLE 1

A mixture of 80.5 grams (0.5 mole) of o-chlorobenzyl chloride, 48.6 grams (0.5 mole) of potassium thiocyanate, and 100 ml. of ethanol was heated at reflux temperature for 2.5 hours. The ethanol was then distilled off under reduced pressure. The residue was extracted with ether. Following removal of the ether from the extracted material, the residue was recrystallized from ethanol and dried to yield purified o-chlorobenzyl thiocyanate (calculated for $C_8H_6ClNS$: N, 7.63%; Cl, 19.35%. Found: N, 7.49%; Cl, 20.09%).

EXAMPLE 2

A mixture of 80.5 grams (0.5 mole) of p-chlorobenzyl chloride, 48.6 grams (0.5 mole) of potassium thiocyanate, and 100 ml. of ethanol was heated on a steam bath for 2.5 hours and then allowed to stand at room temperature overnight. The ethanol was removed by distillation under reduced pressure. The residue was washed with water and with ether and then recrystallized from methanol. The p-chlorobenzyl thiocyanate after drying contained 19.4% Cl and 7.47% N (calculated for $C_8H_6ClNS$: Cl, 19.4: N, 7.63).

EXAMPLE 3

A mixture of 133 grams of o-chlorobenzyl chloride, 109 grams of p-chlorobenzyl chloride, 146 grams of potassium thiocyanate, and 300 ml. of ethanol was heated at reflux temperature for 3.5 hours and then allowed to stand overnight at room temperature. After removal of ethanol by distillation, the residue was washed with hot water and then dried. The product, which weighed 261 grams, contained approximately 55% of o-chlorobenzyl thiocyanate and 45% of p-chlorobenzyl thiocyanate.

EXAMPLE 4

A mixture of 97.7 grams (0.5 mole) of 2,4-dichlorobenzyl chloride, 48.6 grams (0.5 mole) of potassium thiocyanate, and 100 ml. of ethanol was heated at reflux temperature for 2.5 hours. After removal of ethanol by distillation under reduced pressure, the residue was extracted with three portions totalling 350 ml. of hot water. The aqueous extract was cooled and then extracted with three portions totalling 350 ml. of ether. The combined ether extracts were evaporated to dryness to give a 74.5% yield of 2,4-dichlorobenzyl thiocyanate. The product, which melted at 59.0°–59.8° C., contained 6.38% N and 32.3% Cl (calculated for $C_8H_5Cl_2NS$: N, 6.48%; Cl, 32.5%).

EXAMPLE 5

A mixture of 97.7 grams (0.5 mole) of 3,4-dichlorobenzyl chloride, 48.6 grams (0.5 mole) of potassium thiocyanate, and 100 ml. of ethanol was heated at reflux temperature for 2.5 hours. After removal of ethanol by distillation under reduced pressure, the residue was taken up in 150 ml. of water. The resulting water layer after separation from the oil layer was extracted with four 50 ml. portions of ether. The ether extracts were combined with the oil layer. After removal of the ether, the residue was recrystallized from ethanol and dried. There was obtained a 76% yield of 3,4-dichlorobenzyl thiocyanate. The product, which melted at 44.5°–45.8° C., contained 6.46% N and 31.9% Cl (calculated for $C_8H_5Cl_2NS$: N, 6.48%; Cl, 32.5%).

EXAMPLE 6

The starting material used in this reaction was a mixture of dichlorobenzyl chlorides which contained 50% of 2,5-dichlorobenzyl chloride, 37% of 2,4-dichlorobenzyl chloride, and 13% of 3,4-dichlorobenzyl chloride. One mole (195.4 grams) of this mixture of dichlorobenzyl chlorides, one mole (97.2 grams) of potassium thiocyanate, and 200 ml. of ethanol were heated together at reflux temperature for 3.5 hours and then allowed to stand at room temperature overnight. After removal of the ethanol by distillation under reduced pressure, the residue was washed with 350 ml. of hot water, then with two 150 ml. portions of hot water, and dried. There was obtained 214 grams of mixture of dichlorobenzyl thiocyanates which contained approximately 50% of the 2,5-dichloro isomer, 37% of the 2,4-dichloro isomer, and 13% of the 3,4-dichloro isomer.

EXAMPLE 7

A mixture of 2,3,6-, 2,4,5-, and 2,3,5-trichlorobenzyl chlorides (172.5 grams; 0.75 mole), potassium thiocyanate (97.2 grams; 1.0 mole), and 200 ml. of ethanol was heated at reflux temperature for 10 hours. The ethanol was distilled off under reduced pressure. The residue was dissolved in 300 ml. of n-butanol, and the resulting solution was heated at reflux temperature for 18 hours. The n-butanol was distilled off under reduced pressure, and the residue was washed with a total of 750 ml. of hot water. There was obtained 195 grams of a mixture of trichlorobenzyl thiocyanate isomers.

EXAMPLE 8

A mixture of 137 grams (0.5 mole) of 2,3,6-trichlorobenzyl bromide, 58 grams (0.6 mole) of potassium thiocyanate, and 200 ml. of ethanol was heated at reflux temperature for 6.5 hours. The ethanol was evaporated from the mixture, and the residue was washed with hot water. The crude product was recrystallized from ethanol. A yield of 111 grams of 2,3,6-trichlorobenzyl thiocyanate was obtained. This material melted at 50°–55° C.

EXAMPLE 9

Four of the chlorobenzyl thiocyanates were evaluated as fungicides by means of a spore germination test. In this test the minimum concentration of the compounds that will inhibit the germination of the spores of various fungi is determined. The fungi used as test organisms are representative of fungus types that are responsible for sizeable economic damage. Their ability to control these fungi is considered to be a reliable indication of the general applicability of the compounds as fungicides.

The procedure for determining the effectiveness of the compounds comprised adding solutions containing various concentrations of the compounds in acetone to samples of sterilized broth which contained 8.5% of honey and 1% of peptone, inoculating the mixtures with spores, and then incubating them for 7 days at 30° C. The minimum concentrations of four chlorinated benzyl thiocyanates that inhibited germination and growth of the test organisms are given in Table 1.

Table 1

| | Minimum Concentration that will Inhibit Germination and Growth of— | | | | |
|---|---|---|---|---|---|
| | Aspergillus niger, p.p.m. | Chaetomium globosum, p.p.m. | Alternaria oleraceae, p.p.m. | Aspergillus oryzae, p.p.m. | Trichophyton mentagrophytes, p.p.m. |
| o-Chlorobenzyl thiocyanate | 100 | 100 | 100 | 100 | 10 |
| p-Chlorobenzyl thiocyanate | 10 | 1 | 100 | 1 | 1 |
| 2,4-dichlorobenzyl thiocyanate | 10 | 1 | 1,000 | 10 | 1 |
| 3,4-dichlorobenzyl thiocyanate | 10 | 1 | 100 | 10 | 1 |

EXAMPLE 10

A polyvinyl chloride composition, typical of the formulations into which the chlorinated benzyl thiocyanates may be incorporated, was prepared from the following ingredients:

| | Parts by weight |
|---|---|
| Polyvinyl chloride | 100 |
| Dioctyl phthalate | 25 |
| Di-(2-ethylhexyl) sebacate | 20 |
| Epoxidized soybean oil | 5 |
| Stearic acid | 0.5 |
| Barium-cadmium-phosphite stabilizer | 3 |

To this formulation were added the amounts of chlorobenzyl thiocyanate indicated in Table 2. The mixtures were blended at room temperature and then charged to a two-roll differential speed mill. Each of the formulations was fused on the mill for 5 minutes at 330° F. and then for the time and at the temperature indicated in Table 2. The compositions were removed from the mill as sheets 0.045 inch in thickness. Samples were then inoculated with a mixture of fungal spores and incubated at 30° C. for a period of 3 weeks. The fungal growth that occurred during the incubation period is also recorded in Table 2.

In Tables 2 and 3 a numerical scale is used to indicate the heat stabiilty of the composition, with a rating of 0 denoting absence of color; 1, very faint yellow; 2, faint yellow; 3, yellow; 4, dark yellow; 6, dark orange; and 9, black. A numerical scale is also used to indicate fungicidal activity. A rating of 0 indicates that no fungal growth occurred on the sample; 1, a trace of growth; 2, very slight growth; 4, slight growth; 6, moderate growth; 8, moderately heavy growth; and 10, heavy growth.

Table 2

| Fungicide | Amount (percent based on weight of composition) | Fusion Conditions | | Fungus Growth after Incubation for— | | | Heat Stability |
|---|---|---|---|---|---|---|---|
| | | Time (min.) | Temp. (° F.) | 1 Week | 2 Weeks | 3 Weeks | |
| 3,4-dichlorobenzyl thiocyanate | 0.5 | 5 | 330 | 1 | 2 | 2 | 0 |
| | 1.0 | 5 | 330 | 0 | 2 | 2 | 0 |
| | 2.0 | 5 | 330 | 0 | 1 | 1 | 0 |
| Do | 0.5 | 15 | 350 | 1 | 2 | 2 | 0 |
| | 1.0 | 15 | 350 | 1 | 2 | 2 | 0 |
| | 2.0 | 15 | 350 | 0 | 1 | 1 | 0 |
| Do | 0.5 | 30 | 350 | 1 | 2 | 4 | 1 |
| | 1.0 | 30 | 350 | 1 | 2 | 4 | 1 |
| | 2.0 | 30 | 350 | 0 | 1 | 2 | 1 |
| Do | 0.5 | 60 | 350 | 2 | 4 | 6 | 1 |
| | 1.0 | 60 | 350 | 2 | 4 | 6 | 1 |
| | 2.0 | 60 | 350 | 1 | 4 | 4 | 1 |
| 2,3,6-trichlorobenxyl thiocyanate | 1.0 | 5 | 330 | 1 | 2 | 4 | 0 |
| | 2.0 | 5 | 330 | 1 | 2 | 4 | 0 |
| Quaternary ammonium naphthenate (Nuodex 100 VT) | 1.0 | 5 | 330 | 0 | 1 | 1 | 1 |
| Do | 1.0 | 15 | 350 | 0 | 1 | 1 | 1 |
| Do | 1.0 | 30 | 350 | 0 | 1 | 2 | 3 |
| Do | 1.0 | 60 | 350 | 1 | 2 | 2 | 9 |
| Control (No Fungicide) | | 5 | 330 | 2 | 6 | 8 | 0 |
| | | 15 | 350 | 2 | 6 | 8 | 0 |
| | | 30 | 350 | 2 | 6 | 8 | 1 |
| | | 60 | 350 | 2 | 8 | 10 | 1 |

From the data in Table 2 it is clear that the fungicidal compositions of the present invention are relatively effective in controlling the growth of fungi and are stable on prolonged heating. The quaternary ammonium naphthenate included in the test for comparative purposes was also an effective fungicide. It was not stable on heating, however, and had darkened appreciably after only 30 minutes heating at 350° F.

EXAMPLE 11

A polyvinyl chloride plastisol was prepared from the following ingredients:

| | Parts by weight |
|---|---|
| Polyvinyl chloride | 100 |
| Methyl acetyl ricinoleate | 70 |
| Barium-cadmium-phosphite stabilizer | 3 |

To this formulation were added the amounts of fungicide indicated in Table 3. The ingredients were mixed at room temperature until a homogeneous product was obtained which was then fused at 350° F. for 20 minutes. Samples of the plastisols were then inoculated with a mixture of fungal spores and incubated at 30° C. for 3 weeks. The heat stability of the plastisols, that is, their color after fusion, and their ability to control the growth of fungi are shown in Table 3.

Table 3

| Fungicide | | Fungus growth after incubation for— | | | Heat Stability |
|---|---|---|---|---|---|
| Product of— | Amount (percent based on weight of plastisol) | 1 week | 2 weeks | 3 weeks | |
| Example 3 | 0.25 | 1 | 1 | 2 | 0 |
|  | 0.5 | 1 | 1 | 2 | 0 |
|  | 1.0 | 0 | 0 | 1 | 0 |
| Example 5 | 0.25 | 0 | 2 | 2 | 0 |
|  | 0.5 | 0 | 1 | 1 | 0 |
|  | 1.0 | 0 | 0 | 0 | 0 |
| Example 6 | 0.25 | 0 | 2 | 2 | 0 |
|  | 0.5 | 0 | 2 | 2 | 0 |
|  | 1.0 | 0 | 2 | 2 | 0 |
| Example 8 | 0.25 | 1 | 2 | 4 | 0 |
|  | 0.5 | 0 | 1 | 2 | 0 |
|  | 1.0 | 0 | 0 | 1 | 0 |
| Quaternary ammonium naphthenate (Nuodex 100 VT) | 0.5 | 0 | 2 | 4 | 9 |
|  | 1.0 | 0 | 1 | 4 | 9 |
| Control (No Fungicide) |  | 2 | 4 | 6 | 1 |

In addition to their use as fungicides in polyvinyl halide compositions, the halogenated benzyl thiocyanates may be applied to or incorporated in other industrial materials normally susceptible to attack by fungi and other microorganisms to prevent such attack. These include, for example, paint, wood, textiles, paper, leather, and the like. These materials are generally treated with a fungicidal composition which contains a halogenated benzyl thiocyanate as its active ingredient. Dispersants, carriers, solvents, diluents, and surface-active agents may also be present in the fungicidal composition.

We claim:

1. A composition resistant to attack by fungi comprising a polyvinyl halide resin and 0.25% to 2% by weight of a halogenated benzyl thiocyanate, said halogenated benzyl thiocyanate having the formula

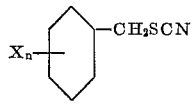

wherein X represents a halogen atom and $n$ represents a number in the range of 1 to 3.

2. The method of controlling fungus growth in polyvinyl halide resin compositions which comprises incorporating in said compositions 0.25% to 2% by weight of a halogenated benzyl thiocyanate, said halogenated benzyl thiocyanate having the formula

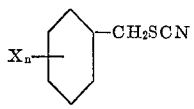

wherein X represents a halogen atom and $n$ represents a number in the range of 1 to 3.

3. The composition of claim 1 wherein the polyvinyl halide is polyvinyl chloride.

4. The composition of claim 3 wherein the halogenated benzyl thiocyanate is a dichlorobenzyl thiocyanate.

5. The composition of claim 3 wherein the halogenated benzyl thiocyanate is a trichlorobenzyl thiocyanate.

6. The composition of claim 3 wherein the halogenated benzyl thiocyanate is 3,4-dichlorobenzyl thiocyanate.

7. The composition of claim 3 wherein the halogenated benzyl thiocyanate is 2,3,6-trichlorobenzyl thiocyanate.

8. The method of controlling fungus growth in polyvinyl chloride compositions which comprises incorporating in said compositions 0.25% to 2% by weight of a dichlorobenzyl thiocyanate.

9. The method of controlling fungus growth in polyvinyl chloride compositions which comprises incorporating in said compositions 0.25% to 2% by weight of a trichlorobenzyl thiocyanate.

10. The method of controlling fungus growth in polyvinyl chloride compositions which comprises incorporating in said compositions 0.25% to 2% based on the weight of said composition of 3,4-dichlorobenzyl thiocyanate.

11. The method of controlling fungus growth in polyvinyl chloride compositions which comprises incorporating in said compositions 0.25% to 2% based on the weight of said composition of 2,3,6-trichlorobenzyl thiocyanate.

12. 2,3,6-trichlorobenzyl thiocyanate.

References Cited in the file of this patent

UNITED STATES PATENTS

| | | |
|---|---|---|
| 2,287,218 | Young et al. | June 23, 1942 |
| 2,418,843 | Leatherman | Apr. 15, 1947 |
| 2,665,202 | Mowry et al. | Jan. 5, 1954 |
| 2,723,909 | Denny | Nov. 15, 1955 |
| 2,840,534 | Clark et al. | June 24, 1958 |
| 2,965,537 | Rosen | Dec. 20, 1960 |

FOREIGN PATENTS

| | | |
|---|---|---|
| 922,398 | France | Feb. 3, 1947 |